United States Patent [19]

Lehureau

[11] Patent Number: 5,124,869

[45] Date of Patent: Jun. 23, 1992

[54] MATRIX DEVICE WITH MAGNETIC HEADS, NOTABLY IN THIN LAYERS

[75] Inventor: Jean-Claude Lehureau, Sainte-Genevieve-des-Bois, France

[73] Assignee: Thomson-CSF, Puteaux, France

[21] Appl. No.: 342,012

[22] Filed: Apr. 24, 1989

[30] Foreign Application Priority Data

Apr. 27, 1988 [FR] France ................... 88 05592

[51] Int. Cl.⁵ ........................ G11B 5/27; G11B 5/20
[52] U.S. Cl. .................................. 360/121; 360/123
[58] Field of Search ............... 360/119, 123, 121, 61, 360/122

[56] References Cited

U.S. PATENT DOCUMENTS

| | | |
|---|---|---|
| 3,309,681 | 3/1967 | Boles et al. |
| 3,483,538 | 12/1969 | Schweizerhof et al. |
| 3,492,663 | 1/1970 | Bobeck et al. |
| 3,662,361 | 5/1972 | Mee |
| 3,881,192 | 4/1975 | Ballinger |
| 3,947,831 | 3/1976 | Kobayashi et al. |
| 4,339,760 | 7/1982 | Wang et al. ............ 360/123 |

FOREIGN PATENT DOCUMENTS 0097836  1/1984  European Pat. Off.
87/00959  2/1987  World Int. Prop. O.

Primary Examiner—Vincent P. Canney
Attorney, Agent, or Firm—Oblon, Spivak, McClelland, Maier & Neustadt

[57] ABSTRACT

A device with magnetic heads for the recording of items of information on a magnetic medium, such as a tape, is disclosed. The magnetic heads are arranged in the form of a matrix network, which is preferably plane. For the excitation of each head, there is provision for a network of conducting wires associated with the matrix network. The excitation conducting wires are, for example, not coiled.

24 Claims, 4 Drawing Sheets

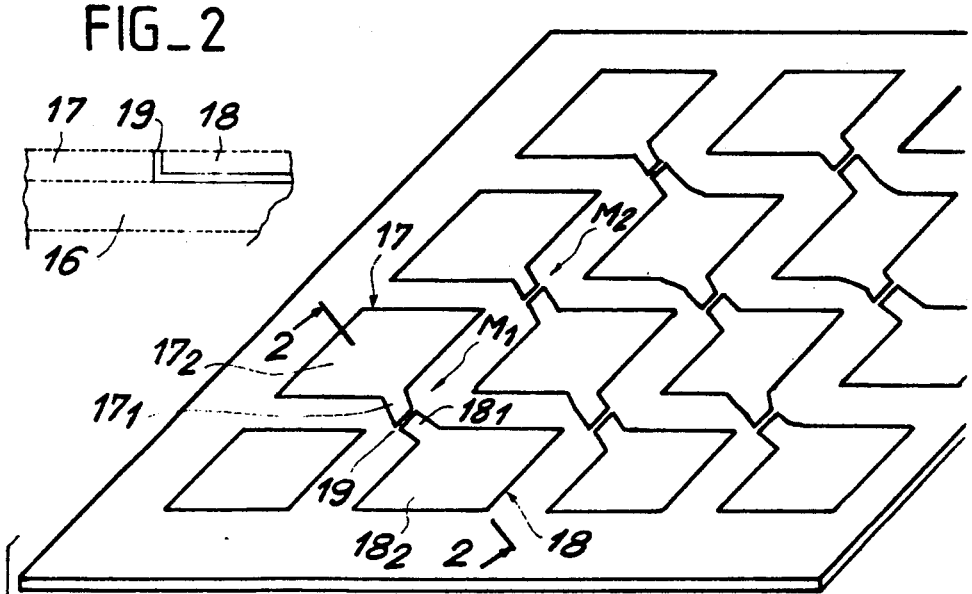
FIG_2
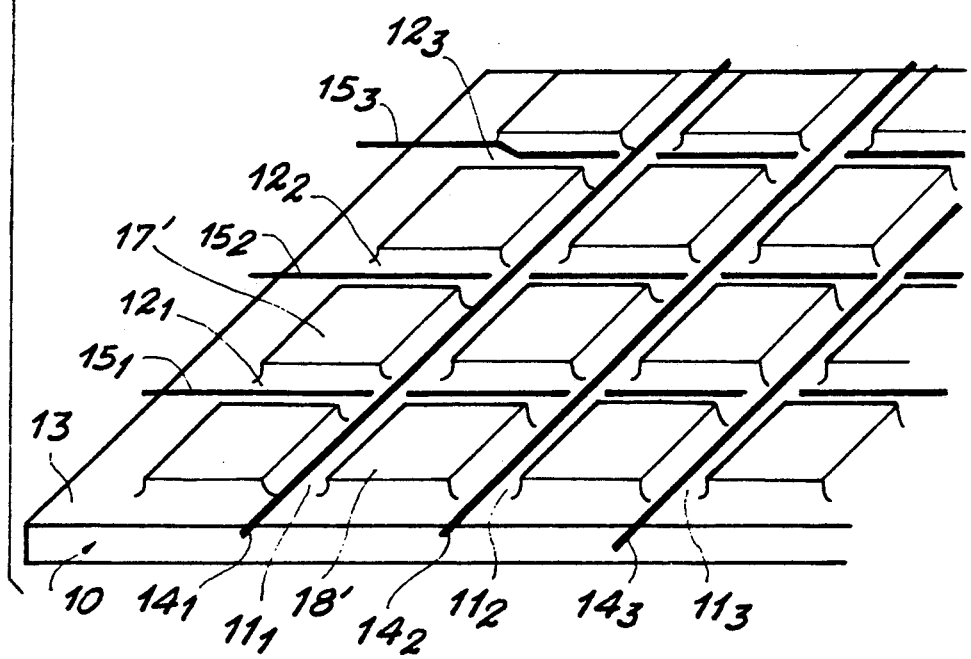
FIG_1

MATRIX DEVICE WITH MAGNETIC HEADS, NOTABLY IN THIN LAYERS

BACKGROUND OF THE INVENTION

1. Field of the Invention

The invention relates to a magnetic recording device with several heads, notably in thin layers.

2. Description of the Prior Art

For the recording and reading of information on magnetic media, notably tapes, it is increasingly being sought to miniaturize the recording heads so as to increase the density of information on the medium. For miniaturization, thin layer heads are generally used.

A magnetic head consists of a magnetic circuit with a gap, associated with a coil to which is applied the signal to be recorded on the medium placed in the vicinity of the gap. This signal applied to the coil creates a magnetic field used to magnetize the small zone of the medium which is in the vicinity of the gap.

It is also sought to associate several magnetic heads so as to prevent motions of the heads. For example, for tapes, especially for video tape recorders, it is useful to provide for a row of magnetic heads, one per track on the tape. Furthermore, the association of several heads enables an increase in the speed with which items of information are written on the medium.

SUMMARY OF THE INVENTION

The invention enables a particularly simple structure of a set of magnetic recording heads.

The device of the invention comprises a matrix network of magnetic heads, wherein the signals to be recorded are provided to each head by simple electrical conducting wires, preferably uncoiled, placed along the same matrix network, each head being thus associated with two wires of different directions. In one embodiment, the network is plane and the wires are rectilinear.

For each magnetic head, there are two corresponding conductive wires, one row wire and one column wire. For this magnetic head to record an item of information on the medium, the sum of the intensities of the currents flowing through each of the wires should exceed a predetermined value. To this effect, the intensity of the current in each conductor of a head recording an item of information has a first value, while the heads that record no information are associated with at least one conductor through which there flows a current having an intensity of a second value, which is smaller in terms of absolute value than the first one. In other words an item of information is recorded solely by the magnetic heads to which correspond the row and column wires that are simultaneously crossed by a current of sufficient intensity.

Preferably, the magnetic heads are of the type having thin layers deposited on a substrate so that the magnetic field created is parallel to the surface of the substrate, the gap forming a layer perpendicular to this surface. To fabricate magnetic heads of this type, it is possible to use a method which consists in firstly depositing a first pole on the substrate and then depositing the material forming the gap. This second layer has a smaller thickness than the first one and covers an end section of the first layer. Then, at least on the gap layer, a third layer of a magnetic material, forming the second pole, is deposited. Finally, these thin layers are polished or cleaned so as to bare the gap. With a method of his type, it is possible to obtain a gap of very small thickness.

To close the magnetic circuit associated with each magnetic head in thin layers, in one structure, there is provision for another substrate made of magnetic material, on which the first substrate is placed by its face opposite to that on which the poles and gap are deposited, poles being formed, in this substrate made of magnetic material, at the locations corresponding to the poles of the magnetic heads. As an alternative, the thin layers are deposited directly on the magnetic substrate which is preferably in the form of a plate or "wafer".

This magnetic substrate has, for example, grooves in which the row and column wires are arranged.

BRIEF DESCRIPTION OF THE DRAWINGS

Other features and advantages of the invention will appear from the following description of some of its embodiments, said description being made with reference to the appended drawings, of which:

FIG. 1 is a drawing showing the various parts of a device with magnetic heads according to the invention;

FIG. 2 is a section, along the line 2—2 of FIG. 1;

Figure 3A:
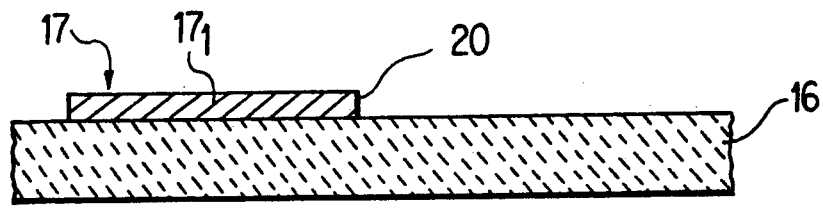
Figure 3B:
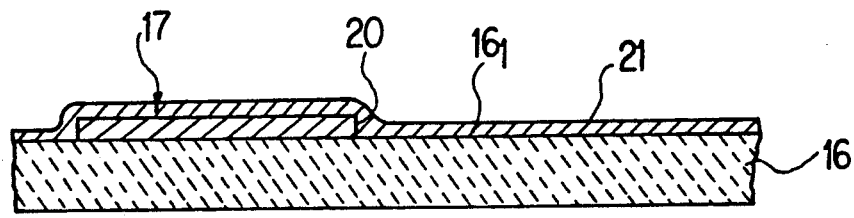
Figure 3C:
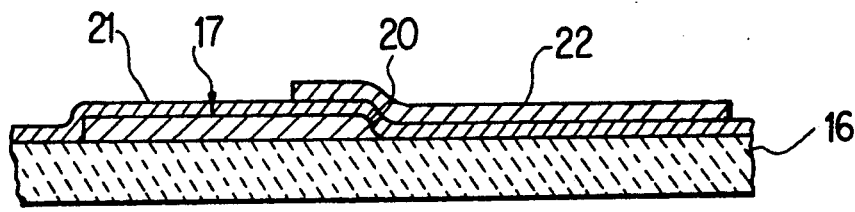
Figure 3D:
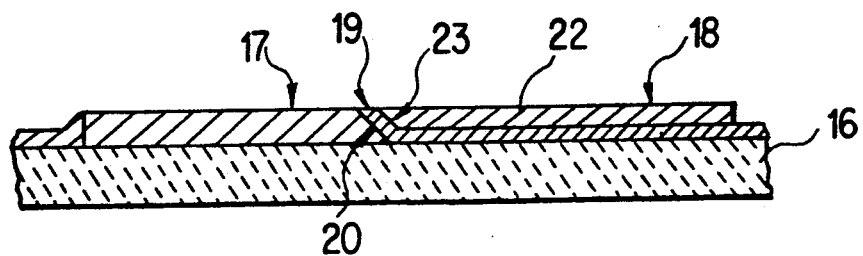
Figures 4, 5:
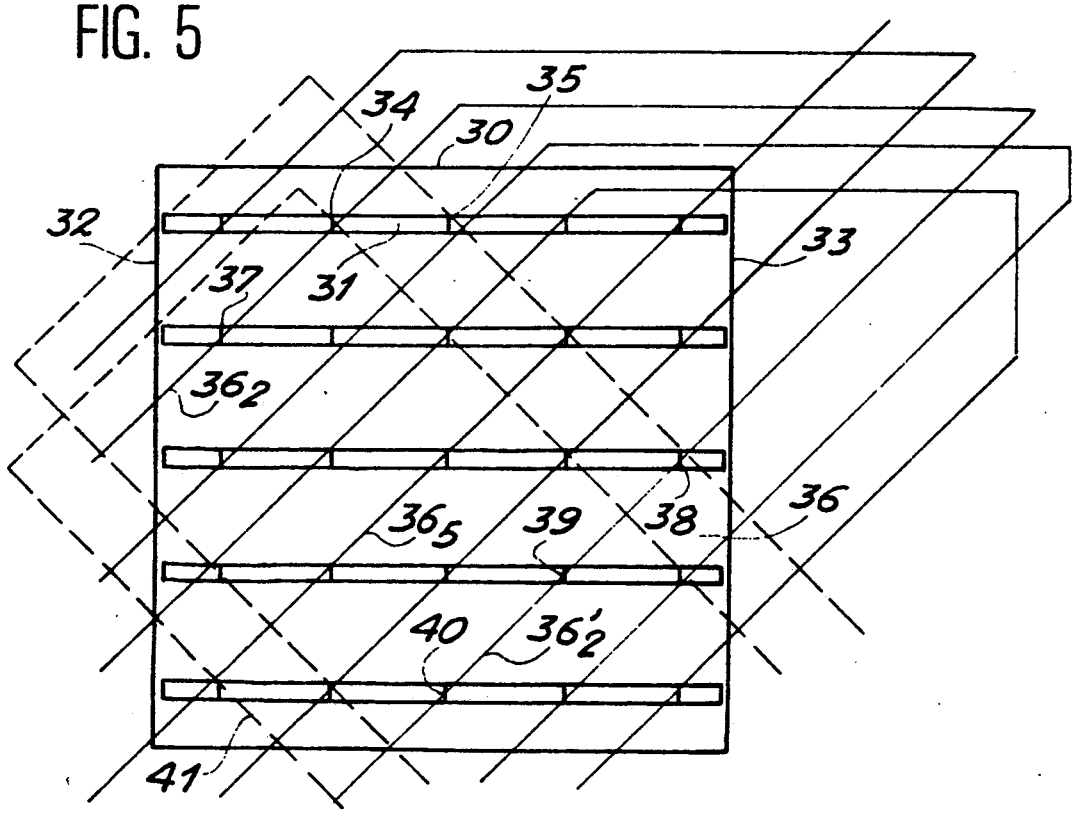
Figure 6:
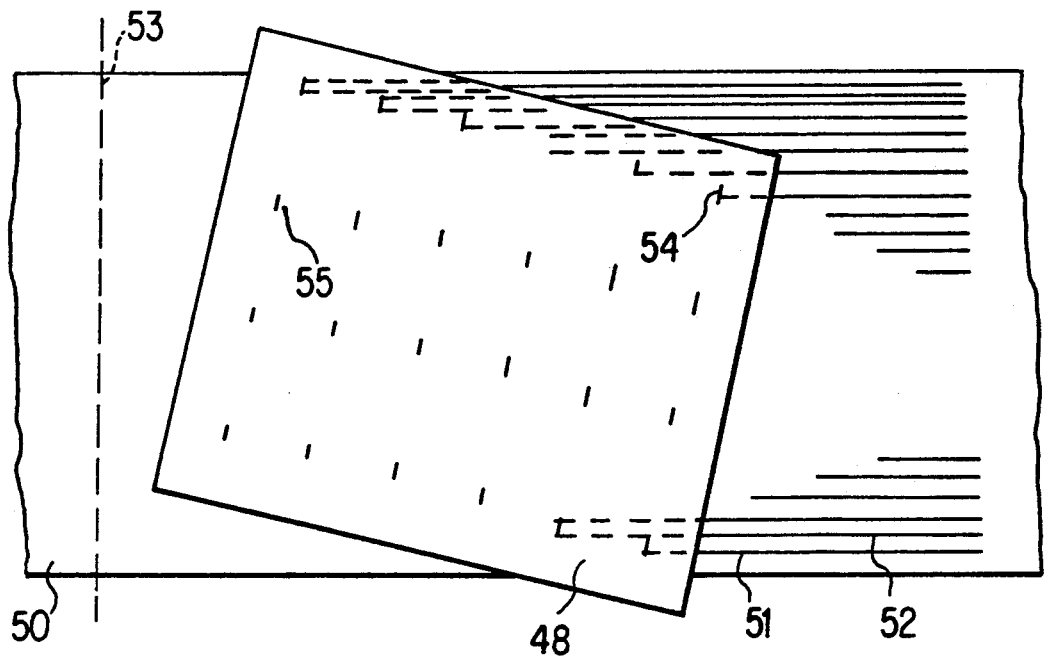
Figure 4A:
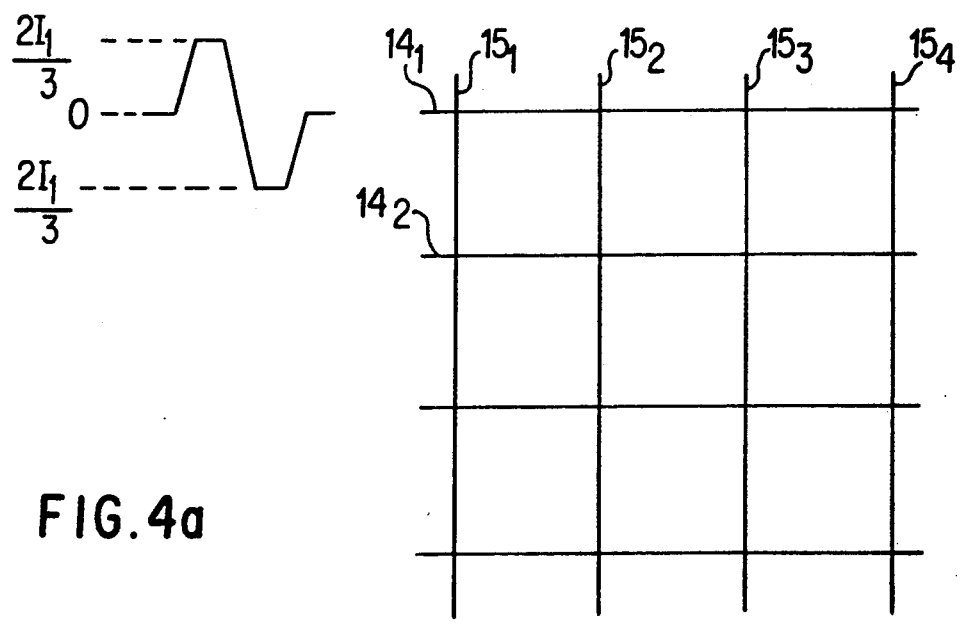

FIGS. $3_a$ to $3_d$ are drawings showing a method of making a magnetic head of the device of FIG. 1;

FIG. 4 is a drawing showing the working of the device of FIG. 1;

FIG. $4_a$ corresponds to a variant of FIG. 4;

FIG. 5 is a drawing of a variant of a device of FIG. 1; and,

FIG. 6 is a drawing showing the use of the device of FIG. 1 or FIG. 5.

DESCRIPTION OF PREFERRED EMBODIMENTS

The device with magnetic heads $M_1, M_2 \ldots$, shown in FIGS. 1 and 2, comprises a wafer 10 made of magnetic material such as a ferrite with rectilinear grooves $11_1, 11_2, 11_3 \ldots, 12_1, 12_2, 12_3 \ldots$ on one of its faces 13. The grooves $11_1, 11_2, 11_3 \ldots$ are parallel to each other and form rows while the grooves $12_1, 12_2, 12_3 \ldots$ are perpendicular to the rows and form columns.

In each groove, there is an electrical conductor $14_1, 14_2, 14_3 \ldots, 15_1, 15_2, 15_3 \ldots$ The conductor $14_1$ is placed in the groove $11_1$, the conductor $14_2$ is placed in the groove $11_2, \ldots$, the conductor $15_1$ is in the groove $12_1$ etc.

To the wafer 10 made of magnetic material, there is bonded another wafer 16 made of non-magnetic material. On the unoccupied face $16_1$ of this wafer 16, are formed the pole pieces 17, 18, and the gap 19 of a series of magnetic heads, the number of which is equal to the number of intersections between the row conductors and the column conductors. The arrangement is such that each gap 19 is beneath the intersection of a row conductor and a column conductor. Thus, in FIG. 1, the gap 19 covers the intersection of the conductors $14_1$ and $15_1$. Furthermore, each pole piece 17, 18, covers a pad or "block" 17', 18' of the plate 10. The term "block" refers to a raised element on the surface 18 which is demarcated by grooves. It is also specified that the conductors 14 and 15 are not secants but that the term "intersection" refers to the point of each of these conductors having a same projection on the plane of the wafer 10.

The pole pieces 17 and 18 and, hence, the blocks 17' and 18' are on either side of the conductor $14_1$ (or of the groove $11_1$) as well as on either side of the conductor $15_1$ (or of the groove $12_1$). Thus the pole pieces 17 and 18 have a part $17_2$, $18_2$ with a greater square-shaped area or rectangular area corresponding to the block 17′, 18′ as well as an extension $17_1$, $18_1$ of one of the corners of the rectangle in the vicinity of the intersection of the conductors $14_1$ and $15_1$. The gap 19 is between these extensions $17_1$ and $18_1$. The general direction of these extensions corresponds to a diagonal, i.e. about 45° with respect to the rows and the columns.

The general direction of the slot of the gap 19 is, for example, parallel to the conductors $14_1$. In one alternative, gaps are inclined by a small angle with reference to this direction whereas other gaps in staggered formation are inclined in reverse direction. In this way, the items of information recorded on the neighbouring tracks can be distinguished by the inclination of the magnetization, thus reducing the risk of diaphony during the reading.

To make the gap 19 as well as the pole 17 and 18 with thin layers, the procedure shown in FIGS. $3_a$, $3_b$, $3_c$ and $3_d$ are followed.

First, the pole piece 17 is formed on the non-magnetic plate 16. In FIG. $3_a$, the flank 20 perpendicular to the surface $16_1$ forms the end of the part $17_1$ of this piece 17, i.e. one of the faces of the gap. The piece 17 is deposited, for example, by photo-etching.

Then (FIG. $3_b$) a non-magnetic layer 21 is deposited. The thickness of this layer 21 is smaller than that of the layer 17, and it covers both the surface $16_1$ of the wafer 16 and the layer 17 as well as its flank 20.

On that part of the layer 21 which is adjacent to the flank 20 of the magnetic layer 17, another magnetic layer 22 (FIG. $3_c$) is deposited.

Finally (FIG. $3_d$), all the layers thus formed are polished so as to bare the piece 17. It is thus seen that, in this way, the pole piece 18 and the gap 19 between the flank 20 of the piece 17 and the flank 23 of the pole piece 18, are formed.

This method, already described in the French patent No. 86 14974 filed on behalf of the applicant, enables the making, in a very simple way, of a magnetic head with thin layers while, at the same time, suitably controlling the thickness of the gap 19. It is true that the non-magnetic layer 21 which remains between the wafer 16 and the pole piece 18 is an obstacle to the closing of the magnetic circuit. However, in practice, it is seen that the presence of this layer 21 would practically not damage the performance characteristics of the head.

The magnetic circuit of each head is closed by the ferrite wafer 10.

As an alternative (not shown), after the wires 14, 15, are fitted in the corresponding grooves, these grooves are filled with a resin or with another meltable or thermosetting material, and then the face thus formed is polished and the pole pieces 17, 18, and the gap 19 are directly deposited on this polished face at the locations of the blocks 17′, 18′. This deposition may be done, for example, by the method described above with reference to FIGS. $3_a$ to $3_d$.

With this method, we do without the non-magnetic substrate 16, and this may improve performance characteristics.

The magnetic head device thus described can be used to record a series of items of information of a digital type on a magnetic medium, for example, a tape. A piece of binary information of 1 (or of 0) is recorded on the tape either by a magnetization with a determined direction and a value exceeding a threshold or by the transitiion between two magnetizations of opposite directions and of values greater than a threshold.

To record a binary digit of this type with a head having a position nm, i.e. a head which is in the order n row and the order m column, a current with an intensity I is injected into the order n row conductor and the order m column conductor. By contrast, in the other conductors, currents of an intensity $-I/3$ are injected.

The intensity I creates a magnetic field of a value which is insufficient to record the binary digit on the tape. By contrast, the magnetic fields created by the two conductors through which a current I flows generate a magnetic field which is sufficient to record a binary digit.

The field created by the current with an intensity $-I/3$ on the non-addressed rows and columns reduces the unwanted fields. For, at a point (normally not addressed) which corresponds to a row (or column) conductor crossed by a current I and a column (or row) conductor crossed by a current $-I/3$, the magnetic field created is equivalent to that generated by a current $I - I/3 = 2I/3$. The necessarily created unwanted field is thus reduced.

It has also been experimentally observed that unwanted fields, of the magnitude of a third of the writing field, affect the reading signal only in an acceptable proportion (10 to 20%). If, on the non-addressed rows or columns, the intensity of the current were to be null, then, at the intersection of a non-addressed row and an addressed column (or the reverse), a magnetization would be obtained corresponding to a current I. This would make the reading even more difficult. If a current of opposite polarity, but with a greater absolute value (for example $-I/2$), were to be made to flow in the non-addressed row or column conductors, then a magnetization, corresponding to a current $-I$, would be obtained at the intersection of the non-addressed rows and columns, and this would produce a unwanted signal for the magnetization of opposite polarity.

In the example of FIG. 4, there are five row wires, $14_1$ to $14_5$, and six column wires, $15_1$ to $15_6$, available, giving thirty magnetic heads in all. In this example, the rows $14_1$, $14_3$ and $14_4$ and the column $15_4$ are addressed, i.e. these conductors are crossed by a current with an intensity I while the others are crossed by a current with an intensity $-I/3$. Thus three points are recorded: those at the intersection of the column $15_4$ and the rows $14_1$, $14_3$ and $14_4$.

According to one alternative (FIG. $4_a$), two current pulses of opposite directions are successively applied to each row, firstly a positive pulse with an intensity $2I_1/3$ and then a negative pulse with an intensity $-2I_1/3$. On the column conductors, constant intensities $I_1/3$ are applied if it is sought to record a binary digit "1" or $-I_1/3$ if it is sought to record a binary "0".

At the intersection of the conductors $14_1$ and $15_1$, when the pulse $2I_1/3$ appears, its effect gets added to that of the current $I_1/3$ on the conductor $15_1$ to magnetize the magnetic medium with a field corresponding to the current $I_1$, having a value sufficient to record a "1". By contrast, thereafter, during the negative pulse $-2I_1/3$, the magnetization corresponds to the current $-I_1/3$ which generates a field that is insufficient to erase the already recorded information.

At the intersection of the conductor $14_1$ and the conductor $15_2$ of FIG. $4_a$, when the positive pulse appears, the magnetization corresponds to a current of an intensity $I_1/3$ which is insufficient to record or erase an item of information. When the negative pulse $-2I_1/3$ occurs, the magnetization is equivalent to that produced by a current $-I_1$, which enables the recording of a "0".

It must be noted that, in this embodiment, unlike what was described with reference to FIG. 4, an item of information is recorded at all the points of each line.

In general, in this embodiment, upon the appearance of the pulse with the same sign as the current on the associated column, the sum of the row and the column currents is sufficient to record an item of information. During the pulse with an oppsoite direction, the sum of the currents is not enough to record or erase an item of information. Favorable results are obtained when the absolute value of an alternation of bipolar intensity is equal to twice the absolute value of the constant intensity in a column.

In the alternative embodiment shown in FIG. 5, the device with magnetic heads also has the general shape of a rectangle. However, it differs from the one shown in FIG. 1 by the fact that the pole pieces of a head are not diagonally oriented but are in the direction of a side 30 of the rectangle.

Thus the pole pieces form simple strips extended in a direction parallel to the side 30. The pole pieces, for example those referenced 31 in FIG. 5, which are not at the ends (near the edges 32 and 33 perpendicular to the edge 30) are common to two magnetic heads. It is seen, in particular, that the pole piece 31 is bordered by two gaps 34 and 35.

In the ferrite wafer 36, the grooves which reach the signal recording conductors are diagonally oriented.

To obtain matrix addressing and excitation similar to those of FIG. 4, each conductor has two parts in series. For example, the conductor $36_2$ has a first rectilinear part associated with the gap 37 on the second row, and with the gap 34 on the first row, as well as a second part $36_2'$, in series with the first part, associated with gaps 38, 39 and 40 on the third, fourth and fifth rows. Only one diagonal conductor $36_5$ has only one part. All the row conductors (in two parts or in only one part) encounter the same number of heads.

Similarly, most of the column conductors, which are along the other diagonal, have two parts in series. They all encounter the same number of heads. These conductors 41 have been shown in broken lines in FIG. 5.

In other respects, the embodiment is the same as in the case of FIG. 1.

FIG. 6 shows a device with magnetic heads of the type decribed with reference to FIG. 1 or FIG. 5, simultaneously recording on a number of tracks 51, 52, etc. on a magnetic tape, this number of tracks being equal to the number of magnetic heads in the device 48.

So that the spacing between the tracks can be constant, the gaps of the different heads on one and the same row are separated by a constant distance, and the projection, on the direction 53, crosswise to the tape 50, of the distance between the last gap 54 of a row and the first gap 55 of the following row is equal to the projection, on this same direction 53, of the distance between two neighbouring gaps on one and the same row.

It is seen that, with the device of FIG. 6, a large number of rows can be recorded on a magnetic tape 50 without an excessive density of magnetic heads in the device 48.

To read items of information recorded by the magnetic head device, it is possible either to use this same device or to use any other reading device, notably of the magneto-optical type. A particularly appropriate device is, for example, the one described in the French patent No. 84 08252 wherein there is provision for a light source such as a laser, a magneto-optic transducer, comprising a layer of a ferrimagnetic material, magnetized by the tape when it comes near this material, and a reflecting layer on this material in the vicinity of the tape. The light beam goes through the ferrimagnetic material which is reflected by the reflecting layer. In this way, the direction of polarization of the beam is rotated in one direction, depending on the magnetization of the zone observed, and reflection enables the angular rotation to be doubled.

What is claimed is:

1. A device with magnetic heads having gaps for the recording of items of information on a magnetic medium, wherein the heads are arranged in the form of a matrix network and wherein, for the excitation of each head, there is provided a network of conducting wires associated with the matrix network, said device comprising a wafer made of magnetic material, with intersecting grooves in which conductors are placed, each gap facing the intersection of two conducting wires, when all of said grooves are on one side of said wafer.

2. A device according to claim 1, wherein the pole pieces associated with the gaps of the heads are in thin layers.

3. A device according to claim 1, wherein the grooves in which the conducting wires are fitted are filled with a material, for example a thermosetting material, so that the grooved face of the wafer is plane.

4. A device according to claim 1, wherein the pole pieces associated with the gap of each magnetic head are thin layers deposited on the grooved face of the magnetic wafer.

5. A device according to claim 1, wherein the pole pieces associated with the gaps of the heads are deposited in thin layers on a wafer attached to the magnetic wafer.

6. A device according to claim 2, wherein the gap forms a shoulder of a layer placed beneath one of the layers forming a pole piece.

7. A device according to claim 1, wherein the excitation conducting wires have an oblique direction with reference to the direction taken by the pole pieces of the magnetic heads.

8. A device according to claim 2, wherein each pole piece has a main part and a projection at the end of which the gap is formed.

9. A device according to claim 2 wherein each pole piece is in the form of an elongated strip.

10. A device according to claim 9, wherein strips are common to two magnetic heads.

11. A device with magnetic heads for the recording of items of information on a magnetic medium, wherein the heads are arranged in the form of a matrix network and wherein, for the excitation of each head, there is provided a network of conducting wires associated with the matrix network, wherein the intensity of the electrical current in each conductor of a head, recording an item of information on the medium, has a first value, with the heads that do not have to record information being associated with at least one conductor crossed by a current with an intensity having a second determined value that approximately one third of the absolute value of the first value.

12. A device according to claim 11, wherein the direction of the electrical current having the intensity of the second value is such that it generates a magnetic field that counters the field created by the conductors crossed by the intensity of the first value.

13. A device with magnetic heads for the recording of items of information on a magnetic medium, wherein the heads are arranged in the form of a matrix network and wherein, for the excitation of each head, there is provided a network of conducting wires associated with the matrix network wherein, being designed to record binary information, a conductor associated with a head recording an item of information on the medium is crossed by two successive pulses of opposite polarities and wherein the other conductor associated with the head is crossed by a current of constant intensity, the sum of this constant intensity and the intensity of the pulse of the same sign as this constant current being sufficient to record an item of information while the sum of the constant intensity and the pulse of opposite polarity is insufficient to record or erase an item of information, the sign of constant intensity depending on the value of the binary digit to be recorded.

14. A device according to claim 13, wherein the intensity of the constant current is about half the intensity of a pulse in one direction.

15. A device with magnetic heads for the recording of items of information on a magnetic medium, wherein the heads are arranged in the form of a matrix network and wherein, for the excitation of each head, there is provided a network of conducting wires associated with the matrix network, wherein the intensities of the electrical currents, in each conductor of a head that does not have to record information, are such that they generate unwanted fields of the magnitude of one third of the writing field.

16. A device according to any of the above claims wherein the matrix network is plane.

17. A device according to any one of the claims wherein the conductive wires are rectilinear.

18. A device according to claim 1, wherein the conducting wires are not coiled.

19. A device according to any one of the claims 1, 11, 13 or 15, wherein, in projection in a determined direction, the distance between neighbouring heads of one and the same row is constant and equal to the distance between the last head of a row and the first head of the following row.

20. A device according to any one of the claims 1, 11, 13 or 15, wherein all the row wires are associated with one and the same number of magnetic heads.

21. A device according to any one of the claims 1, 11, 13 or 15, wherein all the column wires are associated with one and the same number of magnetic heads.

22. A device according to claim 20, wherein at least some of the row wires (or column wires) have two parallel parts, the numbers of heads overlaid by each of the parts being unequal.

23. A device with magnetic heads for the recording of items of information on a magnetic medium, wherein the heads are arranged in the form of a matrix network and wherein, for the excitation of each head, there is provided a network of conducting wires associated with the matrix network, wherein the magnetic heads are in thin layers and wherein the gap of each head forms a shoulder of a layer placed beneath one of the layers forming a pole piece.

24. A device with magnetic heads having gaps for the recording of items of information on a magnetic medium, wherein the heads are arranged in the form of a matrix network and wherein, for the excitation of each head, there is provided a network of conducting wires associated with the matrix network, said device comprising a wafer made of magnetic material, with grooves in which conductors are placed, each gap facing the intersection of two conducting wires, when all of said grooves are on one side of said wafer and wherein pole pieces associated with said gaps are in thin layers and wherein each pole piece is in the form of an elongated strip with each of said strips being common to two magnetic heads.

* * * * *